UNITED STATES PATENT OFFICE.

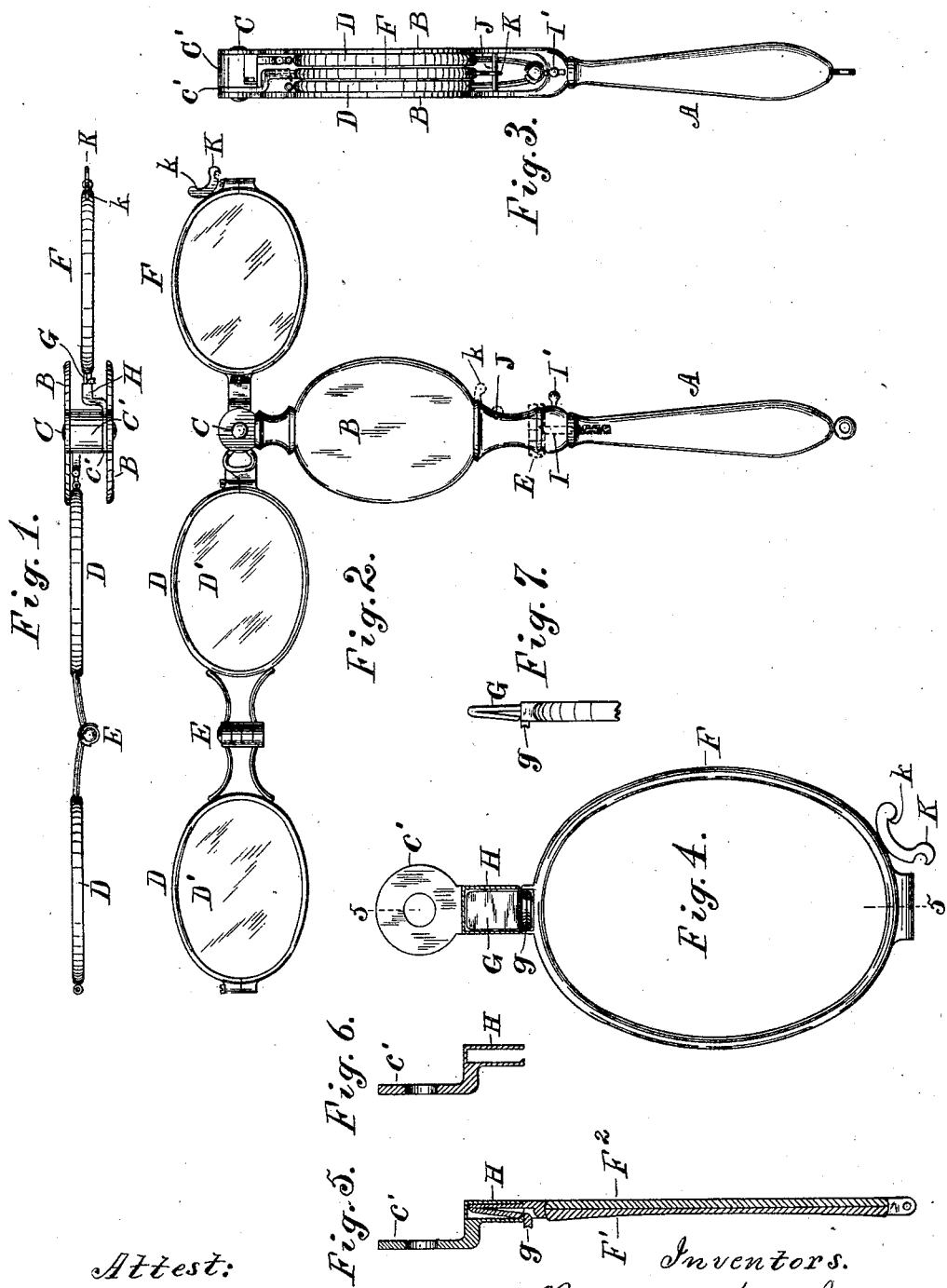

BENNET OSBORN, JR., AND CHARLES L. UHRY, OF NEWARK, NEW JERSEY; SAID UHRY ASSIGNOR TO SAID OSBORN.

LORGNETTE.

SPECIFICATION forming part of Letters Patent No. 683,064, dated September 24, 1901.

Application filed February 16, 1898. Renewed March 1, 1901. Serial No. 49,492. (No model.)

*To all whom it may concern:*

Be it known that we, BENNET OSBORN, Jr., and CHARLES L. UHRY, citizens of the United States, residing at Newark, county of Essex, State of New Jersey, have invented certain new and useful Improvements in Lorgnettes, fully described and represented in the following specification and the accompanying drawings, forming a part of the same.

An ordinary lorgnette is provided nominally with lenses adapted to improve the sight of the user; but where it is used as a mere toy or ornament the lens-frames are sometimes fitted with plain glass, which has no effect upon the vision. In either case the functions of the instrument are very limited; and the object of the present invention is to enable the instrument to perform the additional function of a mirror or reading-glass, which we effect by jointing an auxiliary frame to the pivot within the case and providing the same with a glass adapted for reading or one for reflecting, as a mirror. It will be understood that the term "glass" when used in connection with the "auxiliary frame" is understood to cover either a mirror or reading-glass.

The lens-frame of the lorgnette and the auxiliary frame are jointed to a common pivot and are secured within the case by separate means, so that either may be opened separately, and each is thus adapted for independent use. To adapt the mirror or reading-glass for use conjointly with the regular lenses of the lorgnette, the auxiliary frame is connected to the pivot by a detachable fastening, so that it may be detached and viewed through the lorgnette-glasses. By making the auxiliary frame of the same shape and size as one of the lens-rings it is adapted to fit within the same case as the lorgnette-lenses when the latter are folded together to slide within the case. The mirror may be made concave where it is desired to secure a view of the entire face in so small a glass, and to obtain a contrary effect in the same frame two mirrors may be inserted back to back and one of them made convex to magnify the part that is viewed.

The invention will be understood by reference to the annexed drawings, in which—

Figure 1 is an edge view of the lens-frame and auxiliary frame turned at right angles to the case. Fig. 2 is an elevation of the same parts. Fig. 3 is an edge view of the case with the frames inclosed and locked therein. Figs. 4 to 7 are drawn upon an enlarged scale to exhibit the means for detaching the auxiliary frame from its pivot, Fig. 4 showing the frame and its pivot with the connecting-socket in section. Fig. 5 is a longitudinal section on line 5 5 in Fig. 4. Fig. 6 is a similar section of the pivot and socket, and Fig. 7 is an edge view of one end of the auxiliary frame with the spring-catch thereon.

A designates the handle of the lorgnette-case, B the sides or cheeks of the same, and C the pivot at the outer end of such sides. The sides B are separated sufficiently to admit the lens-frame when folded with the auxiliary frame between its lens-rings, as shown in Fig. 3, and the spring-box C', by which the lens-ring is hinged upon the pivot C, is shortened at one end to admit the hinge-lug $c'$ of the auxiliary frame.

D designates the ordinary lorgnette-frame provided with the glasses D' and jointed in the middle by spring-hinge E, which tends to hold the frame normally extended, as shown in Figs. 1 and 2.

The spring-box C' and the spring-hinge E are illustrated in the usual form commonly employed in lorgnettes, the spring being concealed and only the exterior casing being shown, as the construction of the internal mechanism is too small to illustrate clearly, if shown; but the spring-box C' and the spring-hinge E are of identical construction internally and the same as is commonly used in spring-hinges for doors. Where we have claimed means for ejecting the lorgnette-frame from the base, it will be understood that such language is intended to cover any ordinary spring-hinge suited for the purpose. The arms of the hinge are slightly offset, so that when the frame is doubled, as shown in Fig. 3, a sufficient space is formed between the two lens-rings to insert the auxiliary frame F. The frame F is formed with an ordinary spring-catch G, adapted to fit within a socket H, formed upon the hinge-lug $c'$, but offset, as shown in the drawings, to spring the auxiliary frame to the middle of the casing, as shown in Figs. 1 and 3. The auxiliary frame is thus adapted to fit between the lens-rings of the lorgnette-frame when all the parts are folded together, as shown in Fig. 3. The auxiliary frame is detached from the socket H by pressing the thumbpiece $g$ of the spring G, and such frame may then be held by one hand while the lorgnette-glasses are supported by the other. The auxiliary frame if supplied with a reading-glass may then be used independently or used by looking through the lorgnette-glasses D', or if it be supplied with a mirror it may be viewed with or without the lorgnette-glasses to see the reflection therein.

A small spring-bolt I is fitted in the handle A, and a notch is formed in the spring-hinge E of the lens-frame D to engage such bolt when the frame is doubled within the case, as indicated in Figs. 2 and 3. A stud I' is projected from the bolt I to retract it when the lorgnette is to be opened, and the spring-box C' then operates to extend the frame D, as is common. A cross-bar J is fixed across the case near the handle to limit the inward movement of the lens-frame D, and a hook K is provided upon the auxiliary frame F to spring upon such cross-bar when the frame is pressed within the case, as shown in full lines in Fig. 3 and in dotted lines in Fig. 2. The hook retains the frame within the case by an elastic pressure upon the cross-bar and can be readily retracted by means of a shoulder $k$ when it is desired to draw the auxiliary frame from the case, as shown in Fig. 2.

The auxiliary frame, as stated above, may be furnished with any kind of glass desired by the user, Fig. 5 showing two mirrors F' and F² fitted back to back within the frame F, one of the mirrors having a concave face for the purpose described above. In place of such mirrors a reading-glass can be inserted in case the lorgnette-frame D is provided with weaker glasses for viewing objects at a distance, and such a reading-glass would permit the inspection of smaller objects near by, for which the glasses in the frame D are not adapted.

Where plain glasses are used in the frame D, the auxiliary frame may be furnished with a lens suited for reading or for a distant view.

From the above description it will be seen that the auxiliary frame may be employed to greatly augment the functions of the lorgnette, while it adds very little to the size or cost of the same.

Having thus set forth the nature of the invention, what is claimed herein is—

1. In a lorgnette, the combination, with the handle A and case having pivot at one end of the case, with the lorgnette-frame D hinged thereon, of an auxiliary frame movable upon the pivot to and from the case, and the lens-frames jointed together to double within the case, substantially as herein set forth.

2. In a lorgnette, the combination, with a handle A and case having pivot at one end of the case, of the lorgnette-frame D jointed to double with an intermediate space, and an auxiliary frame movable upon the pivot and adapted to fit within such space, substantially as herein set forth.

3. In a lorgnette, the combination, with the handle A and case having pivot at one end of the case, of the lorgnette-frame D jointed to double with an intermediate space, a movable latch to hold the lorgnette-frame in the case, an auxiliary frame movable upon the pivot into the space between the lenses of the lorgnette-frame, and a catch to secure the auxiliary frame within the case, substantially as herein set forth.

4. In a lorgnette, the combination, with the lorgnette-case having sides B connected at one end by handle A, and at the opposite end by pivot C with the lorgnette-frame D jointed upon such pivot, of an auxiliary frame hinged upon such pivot to fit with the lorgnette-frame between the sides B, and provided with a mirror, as and for the purpose set forth.

5. In a lorgnette, the combination, with the handle A and case having pivot at one end of the case, with the lorgnette-frame D hinged thereon, of the auxiliary frame F having the hinge-lug $c'$ hinged upon the said pivot, and the frame connected with such hinge-lug by detachable fastening, as and for the purpose set forth.

6. In a lorgnette, the combination, with a handle A and case having pivot at one end of the case, of the lorgnette-frame D jointed to double with an intermediate space, and an auxiliary frame having an offset hinge-lug $c'$ fitted to said pivot and adapted thereby to fit between the lenses of the lorgnette-frame when folded within the case, substantially as herein set forth.

7. In a lorgnette, the combination, with the handle A and case having pivot at one end of the case, of the lorgnette-frame D jointed to double with an intermediate space, a movable latch to hold the lorgnette-frame in the case, the auxiliary frame F having an offset hinge-lug $c'$ fitted to said pivot and movable into the space between the lenses of the lorgnette-frame, and provided with the hook K and shoulder $k$ as set forth, and the cross-bar J upon the frame to engage the said hook by elastic pressure, as and for the purpose set forth.

In testimony whereof we have hereunto set our hands in the presence of two subscribing witnesses.

BENNET OSBORN, JR.
    CHARLES L. UHRY.

Witnesses:
 THOMAS S. CRANE,
 BENJ. F. GRISCOM.